United States Patent [19]

Clark

[11] 4,052,502

[45] Oct. 4, 1977

[54] METHOD FOR MANUFACTURING BIDIRECTIONAL HYDRODYNAMIC POLYTETRAFLUOROETHYLENE SEALS

[75] Inventor: William Eugene Clark, Chelsea, Mich.

[73] Assignee: Federal-Mogul Corporation, Southfield, Mich.

[21] Appl. No.: 659,006

[22] Filed: Feb. 18, 1976

Related U.S. Application Data

[62] Division of Ser. No. 541,926, Jan. 17, 1975, Pat. No. 3,984,113.

[51] Int. Cl.² ............................................. B29D 15/00
[52] U.S. Cl. .................................... 264/293; 264/295; 264/320; 264/322
[58] Field of Search ............... 264/127, 293, 320, 322, 264/323, 325, 295; 277/134

[56] References Cited

U.S. PATENT DOCUMENTS

| 2,456,262 | 12/1948 | Fields | 264/127 X |
| 2,781,552 | 2/1957 | Gray | 264/325 X |
| 2,990,206 | 6/1961 | Bagdon | 264/324 X |
| 3,432,587 | 3/1969 | Shinn | 264/127 |
| 3,549,445 | 12/1970 | McMahon | 264/322 X |
| 3,857,156 | 12/1974 | Clark | 264/295 X |

*Primary Examiner*—Richard R. Kucia
*Attorney, Agent, or Firm*—Owen, Wickersham & Erickson

[57] ABSTRACT

A method for manufacturing bidirectional hydrodynamic polytetrafluoroethylene shaft seals. A flat annular wafer of polytetrafluoroethylene of constant thickness is coined at an annular inner portion adjacent the inner periphery to provide first and second circular ribs and a series of straight segmental ribs, each of which extends tangential to the inner side of the inner rib, thereby intersecting the inner rib, the crest of the straight ribs projecting out further than the crest of the inner rib. Then the annular inner portion is formed into a generally frustoconical shape, whereby the straight ribs appear as curved ribs. The frustoconical portion is flexed on installation on a shaft to be generally cylindrical from at least the outer rib to the inner periphery.

2 Claims, 8 Drawing Figures

U.S. Patent  Oct. 4, 1977  Sheet 1 of 2  4,052,502
FIG. 1
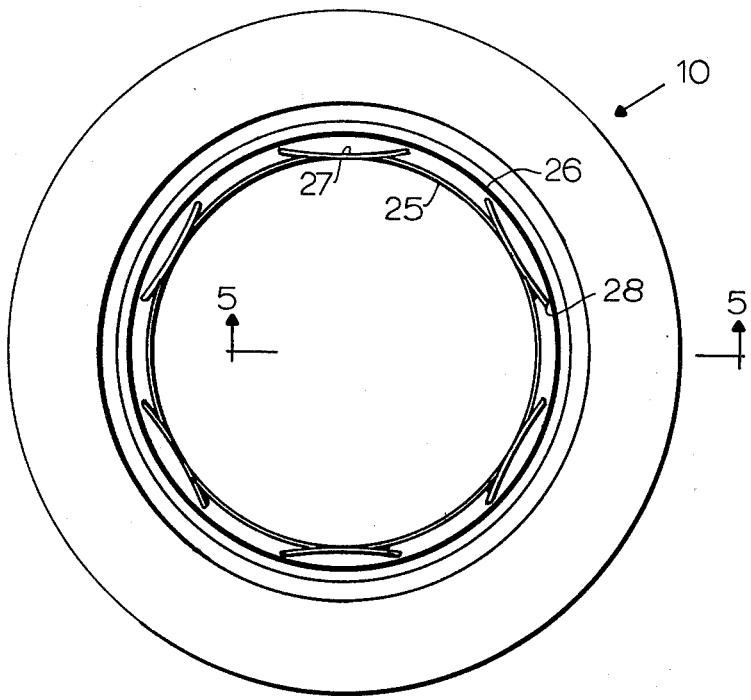
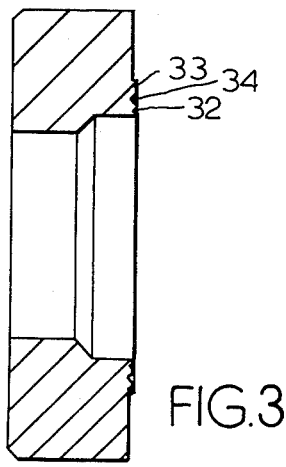
FIG. 3
FIG. 2
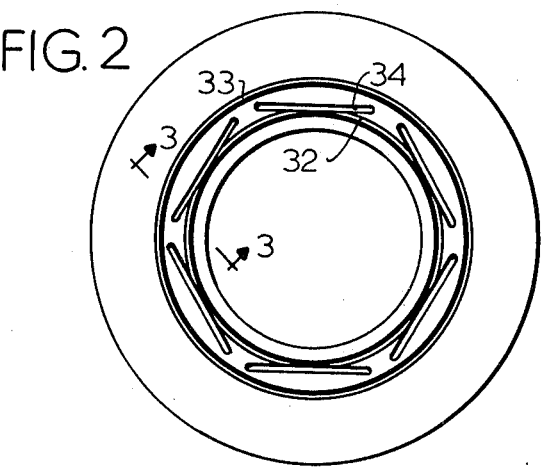
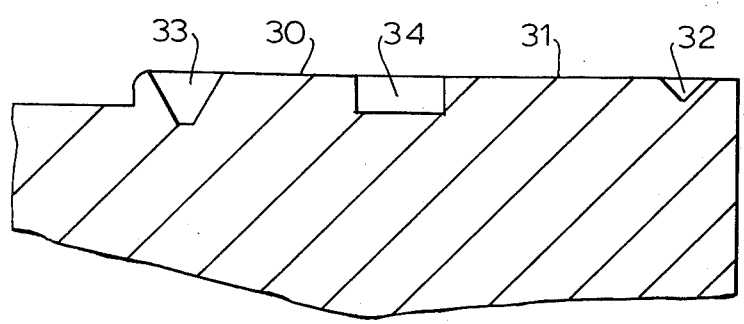
FIG. 4

METHOD FOR MANUFACTURING BIDIRECTIONAL HYDRODYNAMIC POLYTETRAFLUOROETHYLENE SEALS

REFERENCE TO RELATED APPLICATION

This application is a division of application Ser. No. 541,926, filed Jan. 17, 1975, now U.S. Pat. No. 3,984,113.

BACKGROUND OF THE INVENTION

This invention relates to a shaft seal made from polytetrafluoroethylene as the sealing element and so constructed as to be bidirectionally hydrodynamic.

Molded, elastomeric bidirectionally hydrodynamic seals are quite common. However, there has been a total lack of success in the manufacture of hydrodynamic seals having a polytetrafluoroethylene sealing element, principally because of the difficulty in working with this material. Until recently the only known method of obtaining a raised flute formation on a polytetrafluoroethylene hydrodynamic seal was to mold it. Recently, it has been found possible to cold form hydrodynamic features into polytetrafluoroethylene sealing elements, as shown in copending application Ser. No. 523,451, filed Nov. 13, 1974 (a continuation-in-part of Ser. No. 426,365, filed Dec. 19, 1973, now U.S. Pat. No. 3,929,341 and assigned to the assignee of the present invention. This new method has made possible the forming of close dimensional tolerance in the design features of such seals and has made possible manufacture of the seal of the present invention. This is not to say the present invention could not be constructed as a molded polytetrafluoroethylene seal element, but only that it is believed that consistently good results are assured with the new method of manufacture.

Thus, attempts to make hydrodynamic seals of polytetrafluoroethylene were until recently unsuccessful and have become successful only as a result of work involving the present inventor, employing processes which involve either machining a spiral groove or other hydrodynamic structure into the seal or by coining the structure into the seal. The co-pending application Ser. No. 426,373 filed Dec. 19, 1973, now U.S. Pat. No. 3,857,156, does the former, while application Ser. No. 523,451, now U.S. Pat. No. 3,929,341, does the latter, and experience has shown that this latter is a practical method of manufacture of hydrodynamic polytetrafluoroethylene seals. In other words, a flat washer is cold-formed with the aid of a die under considerable pressure into a shape enabling hydrodynamic action. Up to now, however, such hydrodynamic structures gave hydrodynamic action in only one direction of shaft rotation.

Another type of polytetrafluoroethylene seal which has substantially the same foot pattern and functions hydrodynamically in accordance with the same sealing principle is shown in U.S. Pat. No. 3,801,114, granted Apr. 2, 1974, wherein bidirectional hydrodynamic action is achieved by employing three washers or annular wafers of polytetrafluoroethylene for each seal which washers are arranged concentrically side by side. The washers constitute a static seal lip, a set of hydrodynamic flutes, and a second but discontinuous seal lip, respectively. Such a seal performs well, but only when the respective washers are assembled absolutely concentrically, and this may be difficult to achieve on a production basis.

An object of the present invention is to provide a method for manufacturing a shaft seal in which the sealing element is polytetrafluoroethylene and in which that sealing element is so made as to be bidirectionally hydrodynamic. It is an important feature of the invention that the finished shaft seal employs only a single annular wafer or washer of polytetrafluoroethylene and not a plurality of such washers or wafers and yet is bidirectionally hydrodynamic.

SUMMARY OF THE INVENTION

The shaft seal manufactured by the present invention incorporates a metal case which provides a cylindrical bore-engaging wall and which acts to clamp in place the polytetrafluoroethylene sealing member. The sealing member itself is annular with a radially outer annular planar portion that is clamped into the case and a radially inner annular shaft-sealing portion which is nonplanar and is in fact inclined to the planar portion. This inner portion, before installation, is generally frustoconical in shape but after installation most of it becomes generally cylindrical in shape, hugging the shaft.

The sealing member is characterized by the inner portion having a shaft-engaging side with an inner edge and having a pair of spaced-apart concentric projecting circular ribs. In other words, there is a first circular rib which is close to the inner edge of the sealing wafer and a second circular rib spaced away from the first rib and farther from the inner edge. Between the two circular ribs is a series of curved segmental ribs each having a pair of ends that are spaced away from the second rib in the direction of the first rib. Each of these curved ribs is curved toward the first rib, extending into it and actually intersecting it, being substantially tangential to the inner side of the first rib, that is, the side closest to the inner edge.

In order to obtain this structure and to do so in a manner which is practical, the polytetrafluoroethylene element is first made as an annular wafer or washer from flat material. It may be cut out from a flat sheet or it may be machined from a tubular billet. In either event, the starting wafer is flat and of constant thickness. In the method of the invention the inner annular portion of this wafer is then coined while the wafer is still flat and planar, to provide an inner circular rib adjacent the inner periphery and an outer circular rib that is concentric with the inner rib but spaced away from it in the direction of the air side of the seal. The outer rib is of lesser diameter when mounted on the shaft to be sealed than the inner rib since, as explained below, it must function as the static seal lip. The coining operation also provides a series of straight segmental ribs extending tangentially to the inner side of the inner rib, thereby intersecting the inner rib, and the ends of the segmental ribs lie near to but spaced away from the outer rib. The segmental ribs are, as seen when mounted on the shaft to be sealed, of greater inside diameter than the inner circular rib but less inside diameter than the outer circular rib. The diametral size relationship between the inner circular rib and segmental ribs is such that the latter lifts the former slightly off the shaft at the midpoint of the latter to form an oil passageway for each direction.

As explained before, this particular structure and the diametral size relationships important to its hydrodynamic sealing function are made commercially possible by the preferred method of manufacture, which is cold forming by use of coining dies. Thus, coining dies (blank-pierce-coin, or pierce-and-coin) are provided with grooves for coining the two circular ribs by simply cutting circular grooves into the die on a lathe, while the grooves for coining the series of straight rib segments are provided by cutting straight grooves into the die. Both operations are rather easily done by a skilled machinist. The grooves cut for the segmented members are deeper than the grooves cut for the oil side rib but shallower than those cut for the air side rib.

After the coining step, the annular inner portion of the wafer is formed into a generally frustoconical shape. This forming causes the formerly straight ribs to appear as curved ribs. The polytetrafluoroethylene element may be clamped into the case at any time after the coining operation, that is, either before or after forming the frustoconical shape.

When the finished seal is installed in a bore and when a shaft is installed, the sizes of the shaft relative to the sealing element are such that much of the frustoconical portion is then forced into what is substantially a cylindrical shape, at least in the area including the two circular ribs.

The hydrodynamical operation of this seal is as mentioned above substantially that described in U.S. Pat. No. 3,801,114, and we refer to it as "preferential flow" or "plowing", as opposed to an entirely different hydrodynamic sealing principle which is well known in the art and can be referred to as the "pressure gradient" principle. A seal functioning in accordance with the last named principle is shown and described in U.S. Pat. No. 3,347,554.

So it is seen that by a combination of the coining-in of a certain shape on to a flat washer and the forming of that flat washer so that the coined part becomes frustoconical and therefore easily flexed into a cylindrical shaft-engaging shape, bidirectional hydrodynamic action is obtained in such a manner and that bidirectional hydrodynamic action has been obtained on a single-element polytetrafluoroethylene seal. The outer circular rib acts as a limiting wall and helps to retain leaked oil near the segmented ribs.

Other objects and advantages of the invention will appear from the following description of a preferred embodiment.

BRIEF DESCRIPTION OF THE DRAWINGS

In the drawings:

FIG. 1 is a view in end elevation of a shaft seal manufactured by a method embodying the principles of the invention.

FIG. 2 is a view in end elevation of one of the die elements used in making the seal of FIG. 1, this being the die element that forms the ribs, the other die element being flat.

FIG. 3 is a view taken along the line 3—3 in FIG. 2 and showing the die in elevation and in section.

FIG. 4 is a considerably enlarged view taken of a portion of the die of FIG. 3, also taken along the line 3—3 in FIG. 2.

DESCRIPTION OF A PREFERRED EMBODIMENT

Figure 5:
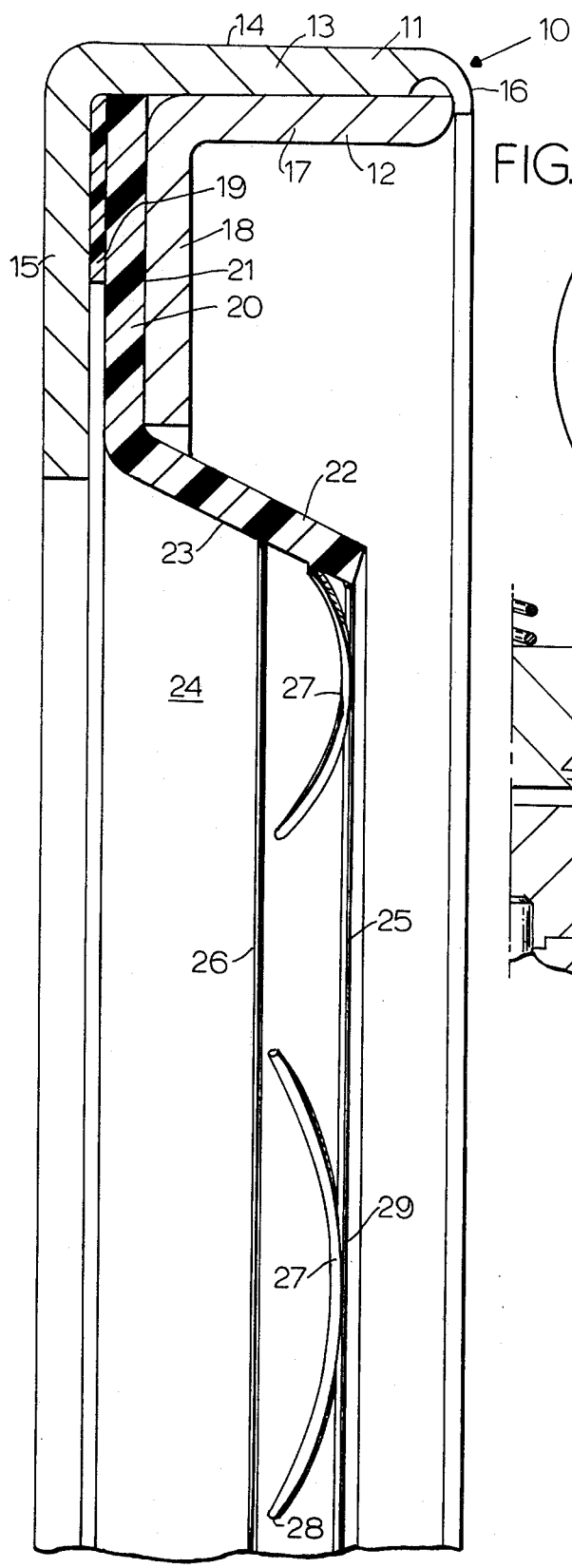
FIG. 5 is a greatly enlarged view in section of a portion of the seal of FIG. 1 taken along the line 5—5 in FIG. 1.

The shaft seal 10 of FIG. 1, a portion of which is shown greatly enlarged in FIG. 5, incorporates an outer metal case 11 and an inner metal case 12. The outer metal case 11 is provided with a cylindrical portion 13 having a cylindrical bore-engaging wall 14 and a radially inwardly extending flange 15. It is also provided with an edge portion 16 which during manufacture is curled in a well-known manner to hold the inner case 12 in place and to clamp between them a polytetrafluoroethylene sealing element 20. The inner case 12 has a cylindrical portion 17 that nests against the cylindrical portion 13 and a radial portion 18 that faces the radial flange 15 and forces the element 20 to be clamped between the elements 15 and 18. Preferably, a small annular gasket 19 is provided between the flange 15 and the sealing element 20.

The sealing element 20 is made from polytetrafluoroethylene and has an annular planar portion 21 which is used for the clamping action to hold the seal in place in the metal case. The element 20 also has an inner annular portion 22 which provides the sealing structure that engages the shaft.

Figure 8:
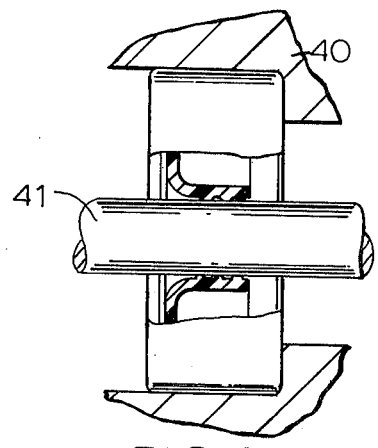
FIG. 8 is a view in side elevation and partly in section of the seal in installed position.

As can be seen from FIG. 5, the sealing portion 22 has a shaft engaging side 23 which is generally frustoconical until it is flexed, as in FIG. 8. The side 23 is provided with a generally smooth surface 24 but has a projecting inner circular rib 25 and an outer circular rib 26 and a series of curved ribs 27, the outer ends 28 of which are spaced away from the rib 26 but are much closer to it than to the rib 25, while the curved portion bows in and intersects the rib 25, lying generally tangential to the inner side 29 of the rib 25. When the seal 10 is installed in a bore 40 and a shaft 41 is inserted (see FIG. 8), a substantial part of the portion 22 lies generally cylindrically around the shaft 41, with the ribs 25, 26 and 27 all in contact with the shaft.

As explained in co-pending application Ser. No. 296,077, now U.S. Pat. No. 3,868,105, this structure results in hydrodynamic action especially if the rib 27 is wider than the rib 25, and preferably it is wider and even somewhat higher, projecting out further from the surface 24.

Figure 6:
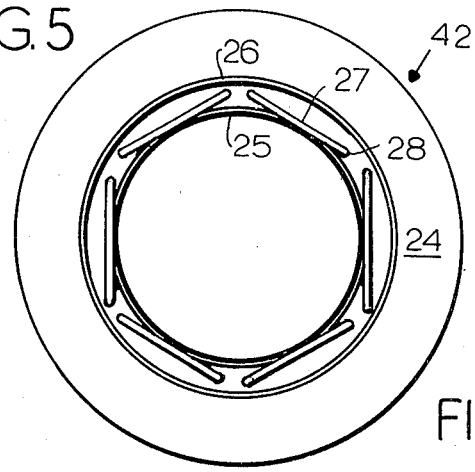
FIG. 6 is a top plan view on a reduced scale of the sealing element of FIG. 5 at one stage of its manufacture in which it is a flat annular wafer not yet formed into a frustoconical shape.

It might be thought that a structure such as that described would be very difficult to obtain. One of the key points of the present invention is that this structure can be readily obtained. It is obtained by a coining action on the polytetrafluoroethylene in a coining die, and the die itself can be readily made. One element of the die is substantially flat and holds a flat annular wafer 42 in its annular form, as shown in FIG. 6; this conventional element is not illustrated. The other die member, the one which is to form the ribs, is shaped as is illustrated in FIGS. 2, 3, and 4. Thus, the die involved has a projecting inner annular portion 30 having a generally flat surface 31 but cut to provide two circular grooves 32 and 33 and a series of straight grooves 34. The circular groove 32 is used to form the inner circular rib 25. The circular groove 33 is coaxial with the groove 32 and concentric with it and acts to form the outer circular rib 26. The grooves 34 are straight cuts that are tangential to the inner edge of the groove 32 and are therefore readily cut in by using an end mill, so that these grooves 34 are very easily formed into the die portion 30. It would, of course, be very difficult to form curved frustoconical members corresponding to what the finished seal element has. The forming of the grooves 32, 33, and 34 in the die portion 30 is thus easily done.

The coining of the seal wafer 42 is done in the die, applying considerable pressure to compress the wafer 42 between the two die members, thereby coining in to the sealing wafer 42 the two concentric ribs 25 and 26 and the series of straight segmented ribs 27, which may, as shown here, be arranged substantially like a hexagon but interrupted and tangential to the inner edge 29 of the inner circular rib 25. This is the critical stage of formation of the sealing element.

Figure 7:
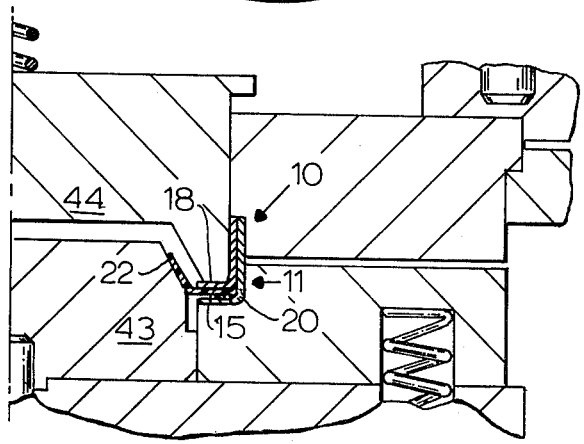
FIG. 7 is a fragmentary view in section of the dies and a seal element, shown forming the frustoconical portion of the seal.

Then, this sealing wafer 42 is placed into another die where it is formed into the shape shown in FIG. 5. This forming may be either before or after placing the polytetrafluoroethylene element in the case 11, 12. It is often convenient to place it in the case first, as shown in FIG. 7, but it may be done without putting it into the case, if that is desired. The die assembly of FIG. 7 shows two frustoconical die members 43 and 44 that close together and deform the wafer 42 under considerable pressure. However, this formation does not take out the ribs 25, 26, and 27, which are formed under even greater pressure.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A method for making a bidirectional hydrodynamic polytetrafluoroethylene sealing element, including in combination:
   providing a flat annular wafer of polytetrafluoroethylene of constant thickness and having an outer periphery and an inner periphery,
   coining in an annular inner portion of said wafer adjacent said inner periphery to compress said inner portion and make it thinner than the remainder of said wafer, while providing controlled areas that are coined to a lesser degree, thereby to provide a circular rib adjacent to said inner periphery projecting out from said inner portion and having an inner side on the side nearer said inner periphery, and a series of straight segmental ribs spaced apart from each other and extending out from said inner portion along linear paths tangential to the inner side of said circular rib, thereby intersecting said inner rib, said segmental ribs projecting out further from the surface of said inner portion than said circular rib, and
   forming said annular inner portion into a generally frustoconical shape, whereby said straight ribs appear as curved ribs, said frustoconical portion being flexed on installation on a shaft into a generally cylindrical portion where said ribs lie.

2. A method for making a bidirectional hydrodynamic polytetrafluoroethylene sealing element, including in combination:
   providing a flat annular wafer of polytetrafluoroethylene of constant thickness and having an outer periphery and an inner periphery,
   coining in an annular inner portion of said wafer adjacent said inner periphery to compress said inner portion and make it thinner than the remainder of said wafer and impart to it a generally flat surface while also providing controlled areas that are coined to a lesser degree and therefore project above said flat surface so as to provide an inner circular rib adjacent said inner periphery and an outer circular rib concentric with said inner rib, and projecting further from said flat surface than said inner rib, said inner rib having an inner side on the side nearest said inner periphery, and a series of straight segmental ribs extending tangential to the inner side of said inner rib, thereby intersecting said inner rib, said segmental ribs projecting out farther from said flat surface than said inner rib and projecting out less therefrom than said outer rib, and
   forming said annular inner portion into a generally frustoconical shape, whereby said straight ribs appears as curved ribs, said frustoconical portion being flexed on installation on a shaft into a generally cylindrical shape from at least said outer rib to said inner periphery.

* * * * *